Sept. 5, 1944.   W. H. KLIEVER   2,357,745
ATMOSPHERIC PRESSURE RESPONSIVE DEVICE
Filed June 11, 1942   2 Sheets-Sheet 1
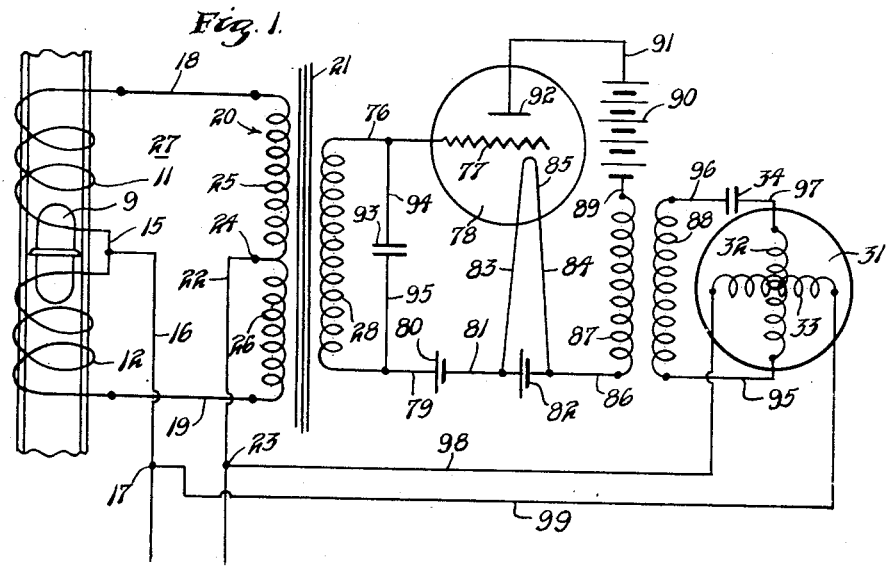
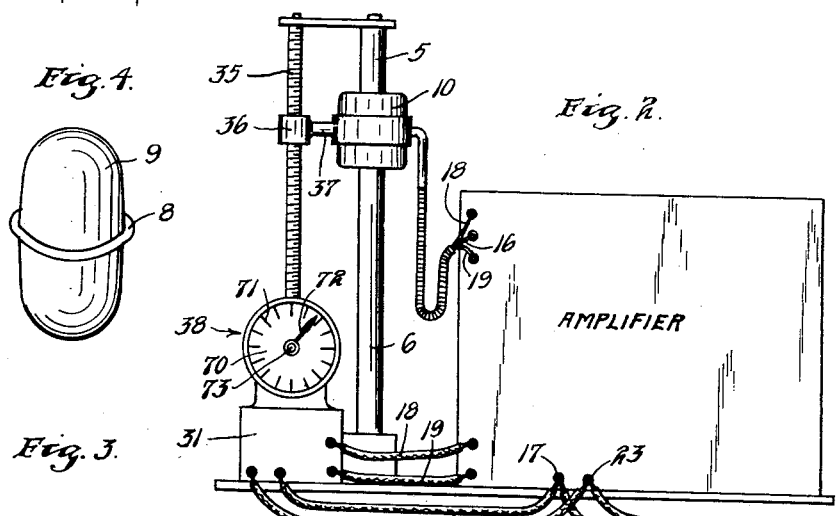
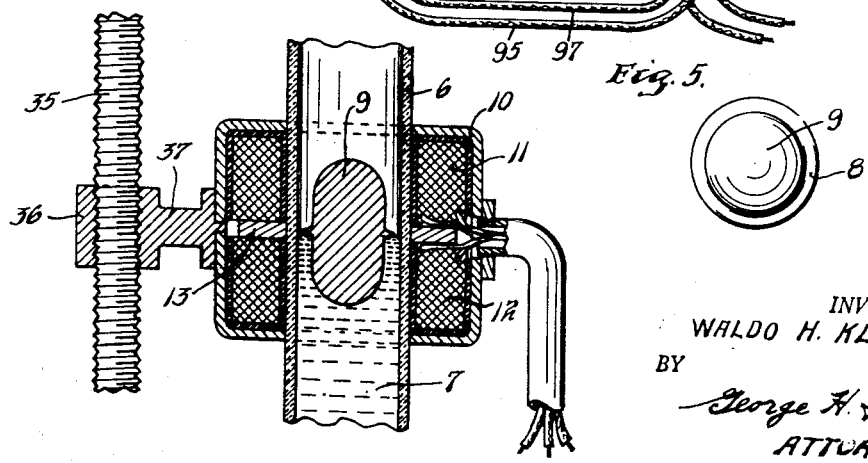
INVENTOR.
WALDO H. KLIEVER
BY
George H. Fisher
ATTORNEY Sept. 5, 1944. W. H. KLIEVER 2,357,745
ATMOSPHERIC PRESSURE RESPONSIVE DEVICE
Filed June 11, 1942 2 Sheets-Sheet 2
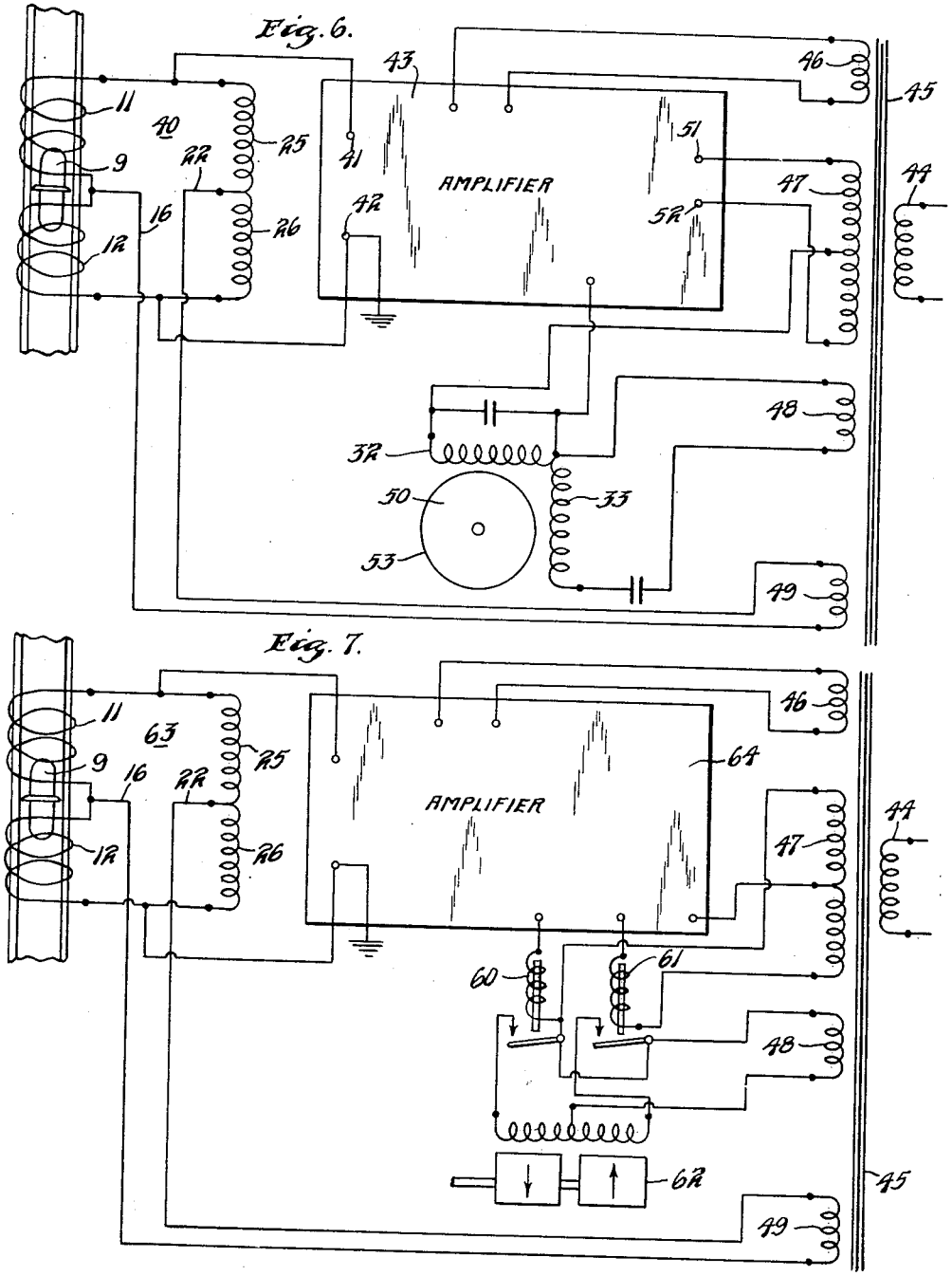
INVENTOR.
WALDO H. KLIEVER.
BY
George H. Fisher
ATTORNEY Patented Sept. 5, 1944

2,357,745

UNITED STATES PATENT OFFICE 2,357,745

ATMOSPHERIC PRESSURE RESPONSIVE DEVICE

Waldo H. Kliever, Minneapolis, Minn., assignor to Minneapolis-Honeywell Regulator Company, Minneapolis, Minn., a corporation of Delaware Application June 11, 1942, Serial No. 446,641

8 Claims. (Cl. 73—4)

My present invention relates to atmospheric pressure responsive devices such as barometers or altimeters.

It is an object of my invention to provide a simple and efficient electrical means for measuring the rise and fall of atmospheric pressure.

Another object of my invention is to provide a variable reluctance bridge circuit and means for unbalancing the said circuit operated by atmospheric pressure responsive means whereby adjustment of indicator means provided for the said device may be effected.

Another object of my invention is to provide automatic means for returning the said unbalanced variable reluctance bridge circuit to a balanced relation and the said return means operating an indicator device for measuring the return movement.

Another object of my invention is to provide floating means in a column of mercury for unbalancing a bridge circuit for regulating a device to be controlled.

A further object of my invention is to provide in a column of mercury floating means actuated by atmospheric pressure on the said column so as to cause the unbalancing of a variable reluctance bridge circuit for the operation of motor means adapted to cause the rebalancing of the said circuit and the appropriate adjustment of suitable means for indicating the said atmospheric pressure or the change therein.

Other objects and advantages of this invention are set forth in the following description, taken with the accompanying drawings; and the novel features thereof are pointed out in the appended claims. The disclosure, however, is illustrative only and I may make changes in detail, especially in matters of shape, size and arangements of parts within the principle of the invention, to the full extent indicated by the broad and general meanings of the terms in which the appended claims are expressed.

In the accompanying drawings wherein like reference characters indicate corresponding parts in the various figures, Figure 1 represents a circuit diagram of a system embodying my invention, Figure 2 is a front elevation of a mechanism embodying in assembled form my invention, Figure 3 is an enlarged cross sectional fragmentary view of the variable reluctance bridge circuit actuating and follow-up mechanism, Figure 4 is an enlarged perspective view of the mercury float, Figure 5 is an enlarged top view of said mercury float, Figure 6 is a circuit diagram of a modified form of my invention, and Figure 7 is a diagram showing a further modified form of my invention.

In the form of my invention illustrated by Figure 2, there is provided a mercury barometer 5 of the conventional type having a tubular or supporting member 6. Within the tubular member 6, as best shown in Figure 3, there is carried by a column of mercury 7, a float formed of suitable magnetizable material. The float may comprise, as shown in Figs. 3, 4 and 5, an iron core 9, on which is mounted a stainless steel flange 8. The under side of the flange 8 is adapted to ride or float upon the upper surface, or meniscus, of the mercury column 7 and to move in accordance therewith as the column of mercury 7 rises and falls. Slidably mounted on the tubular member 6 is a housing or jacket 10, preferably formed of iron bearing material. Mounted in the jacket 10 are magnetic induction coils 11 and 12. The coil 11 is preferably mounted in the upper half of the jacket 10, while the coil 12 is positioned in the lower half thereof, as shown in Figure 3. The coils are preferably separated by suitable material indicated by the numeral 13.

The two coils 11 and 12 are connected by the conductor 15, which is in turn connected intermediate the two coils by the conductor 16 to one terminal 17 of a suitable source of alternating current, as best shown in Figure 1. The opposite ends of the coils 11 and 12 are connected by conductors 18 and 19 respectively, to a primary winding 20 of a transformer 21, which has also provided a secondary winding 28. Connected at 24, intermediate the opposite ends of the winding 20, is a conductor 22, which in turn is connected to the opposite terminal 23 of the aforementioned source of alternating current.

It will be readily seen that the coils 11 and 12 form two arms of a variable reluctance bridge circuit 27. The windings 25 and 26, provided at opposite sides of the intermediate terminal 24 of the primary winding 20, form the opposite arms of the variable reluctance bridge circuit 27.

As is shown in Figure 2, there is further provided a reversible electromagnetic motor 31 coupled to a threaded shaft 35. The shaft 35 is rotated upon energization of the electro-magnetic motor 31. The direction of rotation of the motor 31 is, however, controlled through the bridge circuit 27 in a manner which will be explained hereinafter in complete detail.

A follow-up member 36 screw-threadedly engaged on the shaft 35 is provided so that upon rotation of the shaft 35 by the electromagnetic motor 31 in one direction, the follow-up member 36 will move upward, while upon rotation of the shaft 35 of the electromagnetic motor 31 in the opposite direction, the member 36 will move downward.

The follow-up member 36 and the housing 10 are connected by an arm 37, whereby the housing 10 is slidably positioned on the tubular member 6 as the follow-up member 36 is raised or lowered by the rotation of the shaft 35 through the action of the electromagnetic motor 31.

An indicating device designated generally by the numeral 38 is provided, having a dial 70, indicator marks thereon 71, and a hand or pointer 72 for cooperating with the indicator marks 71. The indicator hand 72 is fastened to a shaft 73 mechanically connected to the shaft 35 by a suitable train of gears, not shown herein, whereby the pointer 72 will be adjusted in proportion to the movement of the casing 10 by the follow-up member 36. The pointer 72 may thereby indicate or measure the movement of the casing 10 on the tube 6.

The bridge circuit 27 previously described is so arranged that with the iron core float 9 positioned substantially equally within the two coils 11 and 12, the flow of current in the windings 25 and 26 will counter-balance the induction of electromagnetic force in the secondary 28 through either winding 25 or 26 so that no current induced by the bridge circuit will flow therein.

However, upon the mercury column 7 rising, due to an increase in atmospheric pressure, the iron core float 9 will move upwardly with the mercury column. The core 9 will then approach further toward or extend further into the coil 11 and be correspondingly removed further from or project less into the other coil 12. The flux threading the coil 11 therefore increases, increasing the impedance of the coil 11. On the other hand, the flux through the coil 12 decreases, decreasing the impedance of the coil 12.

Referring now to the bridge circuit 27, it will be seen that when the impedance of coil 11 increases and the impedance of coil 12 decreases as aforesaid, the bridge circuit 27 becomes unbalanced, whereby the electromagnetic force of the current flowing through the winding 26 will be increased and the electromagnetic force of the current flowing through the winding 25 will be decreased, resulting in the one overcoming the counter-balancing effect of the other so that a flow of current will be induced in the secondary winding 28 by the current flowing in the winding 26 of a magnitude depending upon the degree of unbalancing of the bridge circuit.

Similarly, upon the iron float 9 moving downward past the balancing point, the impedance of the coil 11 will be decreased and the impedance of the coil 12 increased, causing thereby the counter-balancing effect of the electromagnetic force in the winding 26 to be overcome by the electromagnetic force of the winding 25 so that a flow of current will be induced in the secondary winding 28 by the electromagnetic force in the winding 25.

The secondary winding 28 of the transformer 21 is connected at one end by a conductor 76 to the grid 77 of a thermionic amplifying tube 78. The opposite end of the winding 28 is connected by a conductor 79 to the positive terminal of a battery 80 or other suitable source of current. A condenser 93 of suitable value is connected by the conductors 94 and 95 across the secondary winding 28. The negative terminal of the battery 80 is connected by a conductor 81 to the positive terminal of a battery 82. The battery 82 supplies a flow of current through the conductors 83 and 84 to the filament 85 of the thermionic tube 78. A conductor 86 connects the negative terminal of the battery 82 to one end of a primary winding 87.

The opposite end of the primary winding 87 is connected by the conductor 89 to the negative terminal of the battery 90, which has the positive terminal thereof connected by the conductor 91 to the plate 92 of the thermionic tube 78.

It will thus be readily seen that the current induced in the secondary winding 28, as the result of the unbalanced potential of the bridge circuit 27, will be amplified through the action of the thermionic amplifying tube 78, as is well known in the art. The resultant amplified current will of course flow through the primary winding 87. The current flowing in the primary winding 87 will induce a second current into a secondary winding 88.

One end of the secondary winding 88 is connected by a conductor 95 to one end of an auxiliary winding 32 of the electromagnetic motor 31, which is of the two-phase type. A second conductor 96 connects the opposite end of the winding 88 to one side of a condenser 34 of suitable value. The opposite side of the condenser 34 is connected by the conductor 97 to the auxiliary winding 32 at the opposite end from that at which conductor 95 is connected.

The motor 31 has further provided a main winding 33 which is connected at the opposite ends thereof by conductors 98 and 99 to the terminals 17 and 23 respectively of the source of alternating current.

As will be readily seen, the main winding 33 of the motor 31 is connected to the same alternating voltage as the bridge arrangement. If the iron core float 9 is set in such a manner that the bridge circuit 27 is in equilibrium, no current will flow in the auxiliary winding 32 of the motor 31, for there is no alternating current flowing in the secondary winding 28 of the transformer 21 or the input circuit of the amplifying unit. The motor 31 will therefore not operate, for there is no rotating field.

When the iron core float 9 is varied so as to unbalance the bridge circuit 27, a current will flow in the secondary winding 28, causing in turn a current to flow in the output circuit of the amplifier and the said voltage will be either in phase or in phase opposition with the voltage at the terminals 17 and 23, depending upon the direction of the variation or the unbalancing of the bridge.

The condenser 34 connected in series between the secondary winding 88 and the motor winding 32 is of a value sufficient to cause a phase displacement of substantially 90 degrees between the current flowing in the auxiliary winding 32 and the terminal voltage of the main winding 33 as is well known in the art.

In accordance with the well known characteristics of a split-phase motor, when the windings 32 and 33 are supplied with current 90 degrees out of phase, the motor 31 is caused to rotate in a predetermined direction. The motor 31 is adapted to drive the shaft 35 in a direction depending upon the unbalancing of the bridge circuit 27 and the resultant voltage phase of the current supplied from the amplifier to the motor 31. The circuit is so arranged that upon the mercury column 7 rising so as to move the iron float core 9 upward, the voltage phase of the current flowing in the winding 32, as previously described, will be such as to cause the motor 31 to rotate the shaft 35, or other suitable follow-up device, in a direction causing the member 36, screw-threadedly engaged on the shaft 35, to move upward. Such upward movement of the member 36 will cause the jacket or housing 10, fastened to the member 36 by the arm 37, to slide upward on the tubular member 6 until the windings 11 and 12 are thereby adjusted with respect to the iron core float 9 so as to balance the bridge circuit, whereupon the auxiliary current, as previously explained, will no longer flow in the auxiliary winding 32 of the split-phase motor 31 and the motor 31 will therefore no longer operate, since there is no rotating field. Moreover, upon the mercury column falling so as to move the iron core float 9 downward from that position at which the bridge circuit is balanced, the voltage phase of the auxiliary current flowing in the winding 32 will be in opposition to the voltage phase of the auxiliary current previously described and will cause the motor 31 to rotate in the opposite direction, causing the follow-up device 35 to rotate so as to move the member 36 and the housing 10 downward until the windings 11 and 12 mounted in the said housing 10 are adjusted with respect to the iron core float 9 so as to balance once again the bridge circuit. Upon the bridge circuit being in balanced relation, the motor 31 will no longer operate for reasons which have been previously explained.

The motor 31 is mechanically connected to the indicating device 38 by suitable means well known in the art so that the said indicating device will be adjusted upon the upward and downward follow-up movement of the housing 10 and will suitably indicate and measure the rise and fall of the mercury column.

In the operation of my device, it will be readily apparent that as the column of mercury 7 rises and falls due to variations in pressure, there will be caused a flow of current in the split-phase motor 31 having a voltage phase adapted to cause the rotation of the motor 31 in such a manner as to convey a corresponding follow-up movement to the housing 10 and the appropriate adjustment of an indicating device in response to the said pressure.

Figure 6 represents a modified form of my invention wherein the unbalanced potential of the variable reluctance bridge circuit 40 is applied to the input terminals 41 and 42 of an amplifier 43. The amplifier and split-phase motor may be of any suitable type well known in the art, but is preferably of the type shown and described in the copending application of Albert P. Upton, Serial No. 437,561, dated April 3, 1942. The said motor 50 of the split-phase type has one phase supplied directly from a source of power and the other phase supplied from output terminals 51 and 52 of the amplifier 43. Power is supplied to the system from any suitable source of alternating current, to which is connected the primary winding 44 of a transformer 45. Transformer 45 has a plurality of secondary windings 46, 47, 48 and 49. Windings 46 and 47 supply power to the amplifier stages, winding 48 supplies power directly to one winding 33 of the split-phase motor 50 while winding 49 supplies power to the variable reluctance bridge circuit 40. The operation of the amplifier 43 and the split-phase motor 50 is in the manner fully explained in the afore noted copending application of Albert P. Upton.

The split-phase motor 50 is provided with a pair of field windings 32 and 33 and a rotor 53. In the said split-phase type of motor 50, as is well known in the art, the field windings 32 and 33 are displaced in space phase and the displacement in time phase of the currents flowing through the windings determines the direction of rotation of the rotor. The circuit is so arranged that upon the unbalancing of the variable reluctance bridge circuit 40, the rotor 53 drives the follow-up shaft 35 and the indicator device 38 in the manner previously described with regard to the form of my invention illustrated in Figure 1.

A further modified form of my invention is illustrated in Figure 7 and shows an amplifier and motor arrangement which is preferably similar to the modified form shown in the copending application of Albert P. Upton previously noted. In this form a pair of relays 60 and 61 are selectively operated by the variable reluctance bridge circuit 63 through the amplifier 64 to control the direction of rotation of a reversible motor 62. The motor 62 has provided a pair of windings whose selective energization causes rotation of the motor in one or the other direction. The operation of the latter amplifier and motor circuit are fully explained in the application of Albert P. Upton previously noted.

The motor is so arranged as to actuate the follow-up device 35 so as to cause the housing 10 to slidably move along the tubular member 6 in such a manner as to follow the movement of the column of mercury 7. Further, the said motor 62 is so arranged as to properly adjust a suitable indicating device 38 in accordance with the movement of the said column of mercury as previously explained.

Having thus described my invention, what I claim as my invention and desire to secure by Letters Patent is:

1. An apparatus for measuring atmospheric pressure of the class including a tubular supporting member and a column of mercury provided therein and responsive to atmospheric pressure; the improvement comprising a magnetizable float-like core carried by said column of mercury and movable with the column of mercury, a housing slidably mounted on the tubular member, inductive windings mounted in the housing, an electrically balanced bridge circuit, said windings forming a part of said electrically balanced bridge circuit, and said float-like core adapted upon movement of the column of mercury due to changes in pressure to vary the impedance of said windings in such a manner as to unbalance electrically said bridge circuit, electromagnetic motor means adapted to be energized upon the unbalancing of said bridge circuit, the said electromagnetic motor means adapted upon energization thereof to slidably move the housing so as to balance the impedance of the bridge circuit, and means for indicating the said atmospheric pressure controlled by the said electromagnetic motor means.

2. An apparatus for measuring atmospheric pressure of the class including a vertically projecting tubular supporting member, and a column of mercury carried by the said supporting member and responsive to atmospheric pressure; the improvement comprising a magnetizable float-like core carried by the column of mercury and movable with the column of mercury, a housing slidably mounted on the tubular member, a pair of inductive windings, one of said inductive windings mounted at the upper end of the said housing and the other of said windings mounted at the lower end of the housing, an electrically balanced bridge circuit, said inductive windings forming part of said electrically balanced bridge circuit and each of said inductive windings connected in different arms of said bridge circuit, the float-like core adapted upon movement by the said column of mercury in response to changes in atmospheric pressure to increase the impedance of one of said inductive windings and to decrease the impedance of the other of said inductive windings in such a manner as to unbalance said bridge circuit, a screw shaft, a split-phase electromagnetic motor adapted to be energized upon the unbalancing of the said bridge circuit so as to rotate the screw shaft in a predetermined direction dependent upon the direction of the unbalancing of said circuit, and said screw shaft adapted to engage the housing in such a manner as to slidably move the housing so as to follow the movement of the float-like core carried by the column of mercury to cause the balancing of the said bridge circuit, and indicator means operatively connected to said split-phase motor and adapted to be controlled thereby so as to indicate the atmospheric pressure.

3. The combination comprising a fixedly mounted tubular member, a column of mercury carried within said tubular member, said column of mercury movable within said tubular member, an induction winding slidably mounted about the outer surface of said tubular member, a float-like core carried within said tubular member by said column of mercury and responsive to movement of said column of mercury, said float-like core arranged for varying the impedance of said induction winding, a variable reluctance bridge circuit, said induction winding forming part of said variable reluctance bridge circuit, a source of alternating current for said bridge circuit whereby a variance in the impedance of said induction winding causes a shift in the phase of the current at the output terminals of said bridge circuit in relation to said current at the input terminals of said bridge circuit, phase shift responsive power means electrically connected to the output terminals of said bridge circuit for slidably moving said induction winding along the outer surface of said fixedly mounted tubular member for adjusting the impedance of said inductance winding in such a manner as to terminate said phase shift, and indicator means actuated upon movement of said induction winding.

4. In an apparatus of the class described, including a member having a column of mercury provided therein; the improvement comprising a variable reluctance bridge circuit, an adjustable inductance member forming a portion of said bridge circuit, said inductance member being movable along said first named member, a source of alternating current for said bridge circuit, a float-like ferro-magnetic member carried by said column of mercury, said float-like member normally being within the magnetic field of said inductance member, the impedance of said inductance member varying upon movement of said float-like member in relation to said inductance member so as to shift the phase of the alternating current impressed at the output terminals of said bridge circuit relative to the phase of said current impressed at the input terminals of said bridge circuit, phase shift responsive power means electrically connected at the output terminals of said bridge circuit, said power means arranged to adjust the position of said inductance member in relation to said float member for terminating such phase shift.

5. In an apparatus of the class described, including a fixedly mounted tubular member, a column of mercury provided therein, a ferro-magnetic core carried by said column of mercury; the improvement comprising an induction winding slidably mounted on said tubular member and positioned about said core, an electrical bridge circuit, said winding forming part of said electrical bridge circuit, said core arranged to move with the column of mercury so as to vary the impedance of said winding for unbalancing said bridge circuit, a screw shaft, an electromagnetic motor adapted to be energized by the unbalanced potential of said bridge circuit so as to rotate said shaft in a predetermined direction dependent upon the direction of the unbalancing of said circuit, said shaft arranged upon the rotary movement thereof to slidably actuate said winding along said tubular member in such a manner as to follow the movement of the float-like core, and indicator means operatively connected to said motor and adapted to be controlled thereby.

6. In a pressure indicating device, a tubular member enclosing a column of liquid movable in response to pressure changes, a magnetizable float-like member carried by and movable with said column of liquid, induction windings slidably mounted on said tubular member, an electrically balanced bridge circuit, said windings forming a part of said bridge circuit, said float-like member normally being within the magnetic field of said windings and movement of said float-like member relative to said windings varying their impedance in such manner as to unbalance said bridge circuit, electromagnetic motor means controlled by said bridge circuit and operative to move said windings, the unbalance of said bridge circuit resulting in said motor being energized and operable to move said windings to restore the balance of said circuit.

7. In an apparatus of the class described, a tubular member having a movable column of liquid therein, means for indicating the movement of said column of liquid including a magnetizable float-like member carried by and movable with said liquid column, induction windings slidably mounted on said tubular member, an electrically balanced bridge circuit, said windings forming part of said bridge circuit, an electromagnetic motor means controlled by said bridge circuit and operative to slidably move said windings, movement of said float-like member in response to movement of said liquid column varying the impedance of said windings in such manner as to unbalance said bridge circuit, the unbalanced bridge circuit causing operation of said motor means to move said windings to balance said bridge circuit, and indicating means driven by said motor means to indicate the movement of said windings and thereby the movement of the column of liquid.

8. In a pressure indicating device, a tubular member, a column of liquid within said member movable in response to a change in pressure, an induction winding slidably mounted on said tubular member, an electrically balanced bridge circuit, said winding forming a part of said circuit, power means, said bridge circuit controlling the operation of said power means, said power means being operatively connected to said winding in such manner as to move same when said power means is energized, and a float member comprising impedance varying means carried by and movable with said liquid column, said float member normally being within the magnetic field of said winding, movement of said float member relative to said winding varying the impedance of said winding in such manner as to unbalance the bridge circuit energizing said power means to move said winding in a manner to follow the motion of said float member and restore the balance of the bridge circuit.

WALDO H. KLIEVER.